Oct. 5, 1965  W. ZIMMERMANN  3,209,539
PUMP AND MOTOR TRANSMISSION
Filed July 17, 1963  4 Sheets-Sheet 2

INVENTOR.
WILHELM ZIMMERMANN

BY Lindsey, Prutzman and Hayes
ATTORNEYS

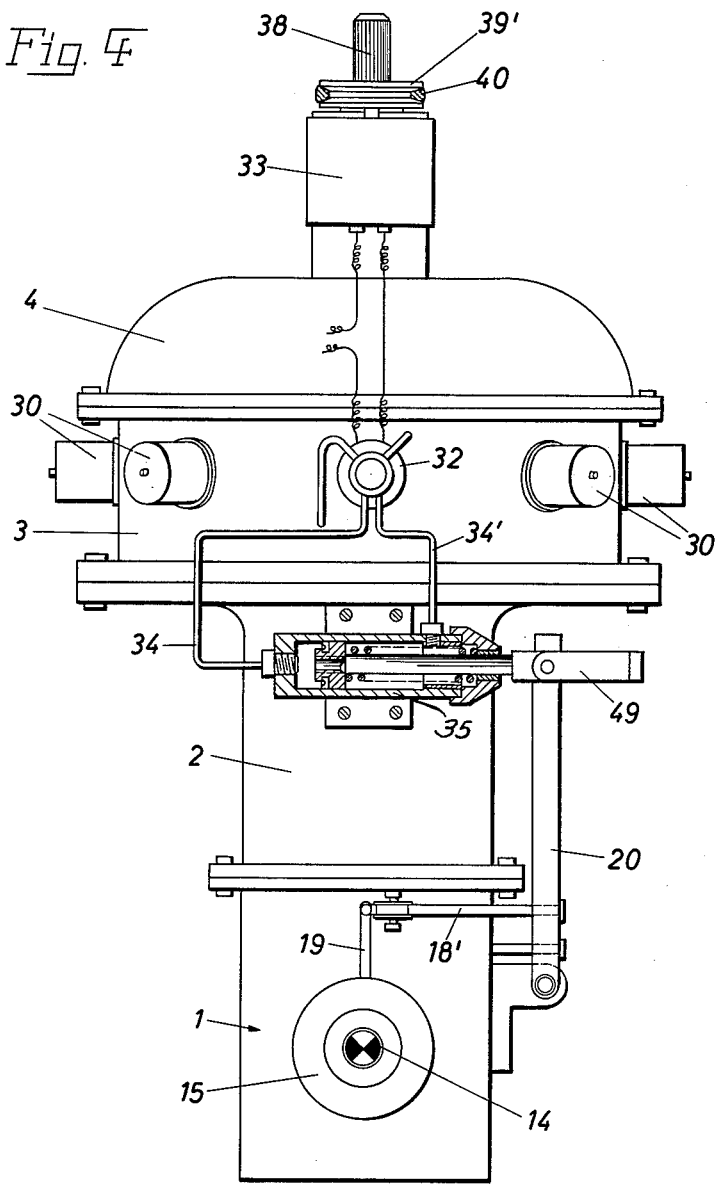

Oct. 5, 1965  W. ZIMMERMANN  3,209,539
PUMP AND MOTOR TRANSMISSION
Filed July 17, 1963  4 Sheets-Sheet 4
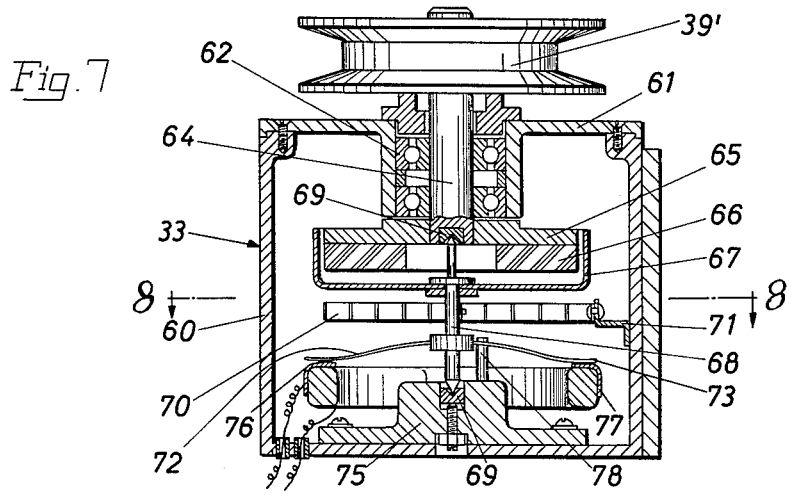
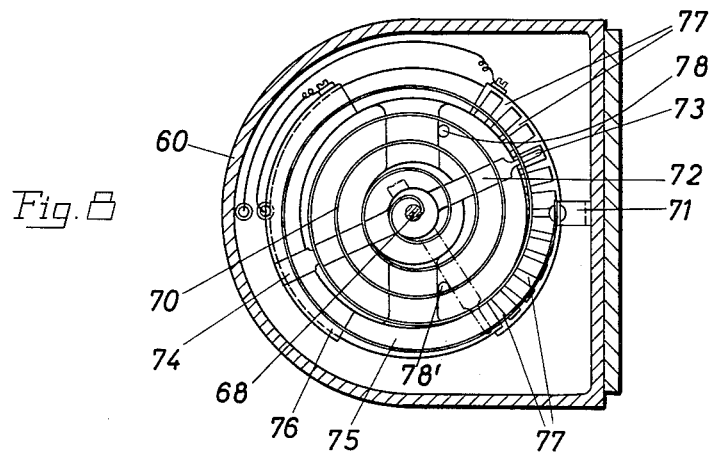
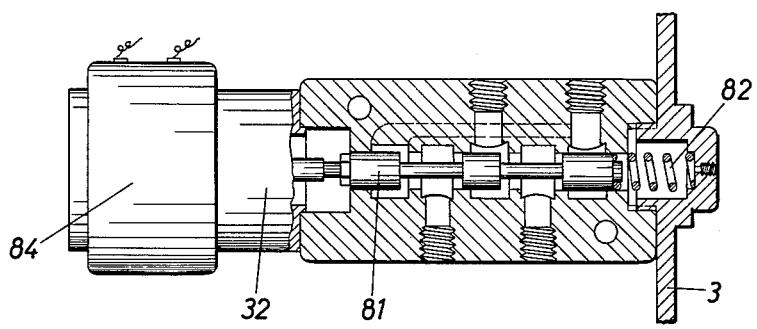
INVENTOR.
WILHELM ZIMMERMANN
BY Lindsey, Prutzman and Hayes
ATTORNEYS United States Patent Office 3,209,539
Patented Oct. 5, 1965

3,209,539
PUMP AND MOTOR TRANSMISSION
Wilhelm Zimmermann, Velbert, Rhineland, Germany, assignor to Stanley-Works G.m.b.H., Velbert, Rhineland, Germany, a corporation of Germany
Filed July 17, 1963, Ser. No. 295,699
8 Claims. (Cl. 60—54)

This invention relates to automatic transmissions of the type having a hydraulic medium for the transmission of power.

It is an aim of the present invention to provide a new and improved hydraulic transmission of the type having a fluid motor and fluid pump in operative connection and controllable for infinitely varying the torque transmitted thereby.

It is a further aim of the present invention to provide a new and useful transmission regulator for controlling the transmitted torque and for automatically "shifting" the transmission upon a change in its output speed.

Another aim of the present invention is to provide a new and improved hydraulic transmission having a positive displacement reciprocating piston type pump supplying a pulsating flow of fluid to a rotary fluid motor.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawings:

FIG. 4 is a longitudinal view, partly broken away and partly in section, of the automatic transmission of FIG. 1;

FIG. 5 is a section view, partly broken away, taken substantially along line 5—5 of FIG. 1;

FIG. 6 is a section taken substantially along line 6—6 of FIG. 1;

FIG. 7 is an enlarged longitudinal section view, partly broken away, of a regulator of the automatic transmissions of FIG. 1;

FIG. 8 is a transverse section view taken substantially along line 8—8 of FIG. 7; and FIG. 9 is an enlarged longitudinal view, partly broken away and partly in section, of a control valve of the automatic transmissions of FIG. 1.

Figure 1:
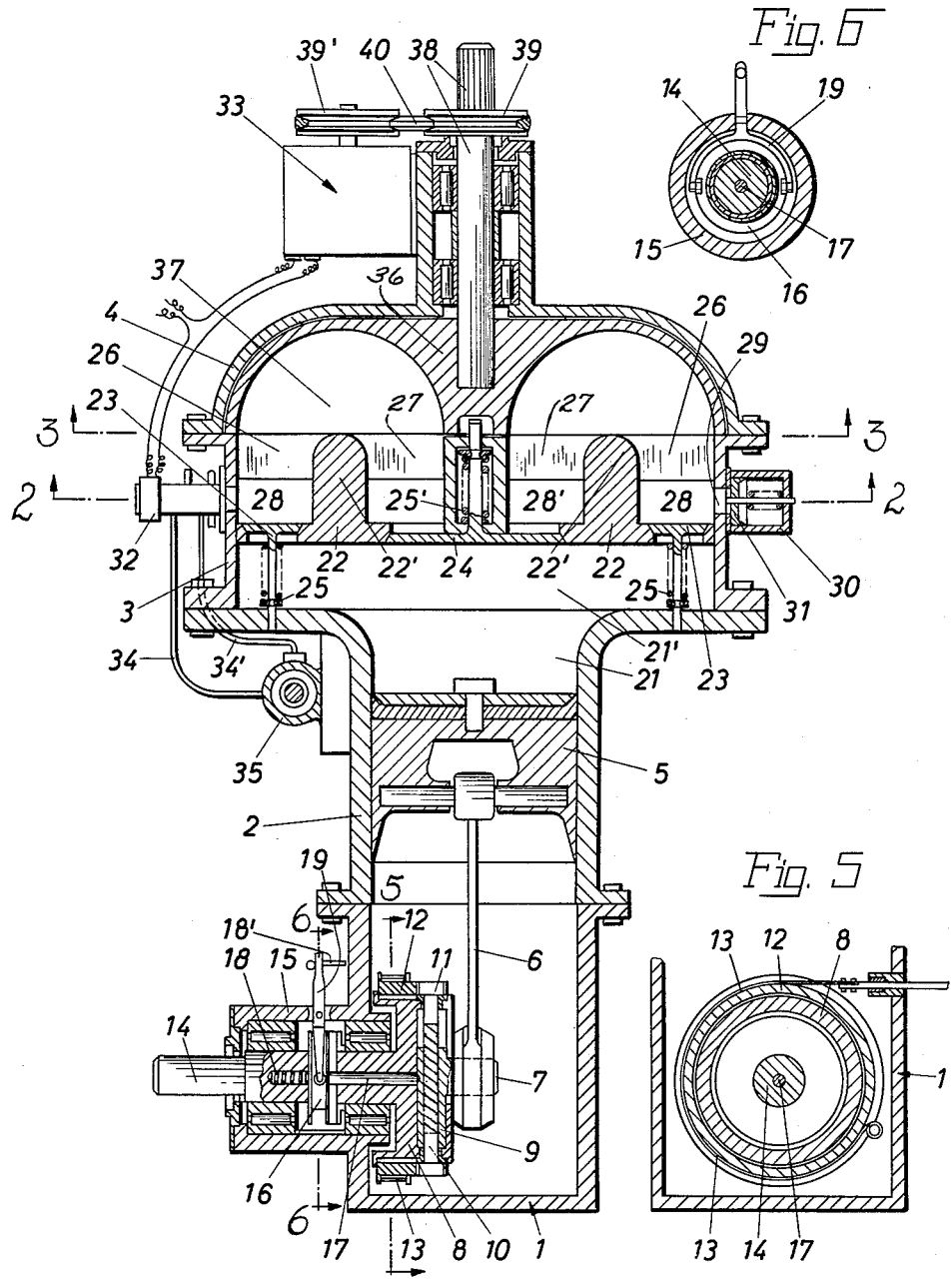
FIG. 1 is a longitudinal section view, partly broken away, of an embodiment of the automatic transmission of the present invention.
Figure 2:
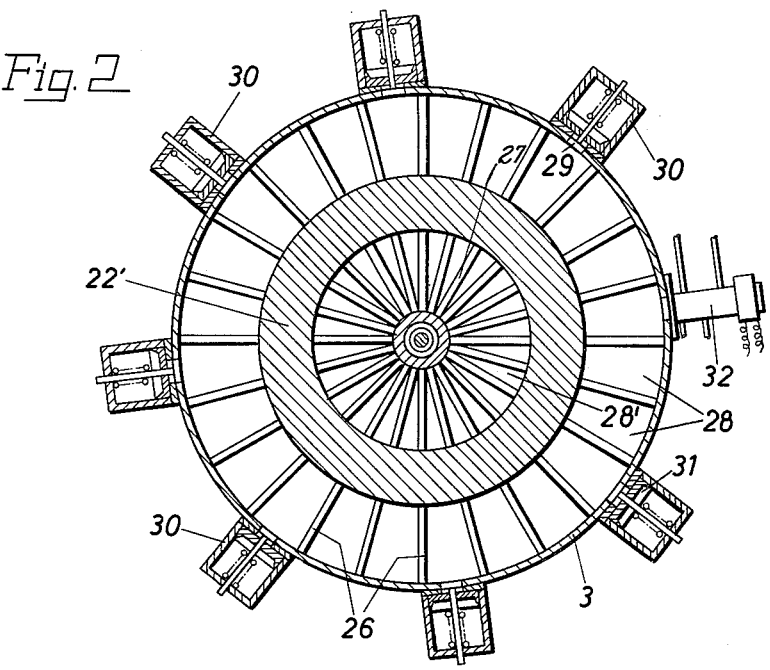
FIG. 2 is a transverse section view, partly broken away, taken substantially along line 2—2 of FIG. 1.
Figure 3:
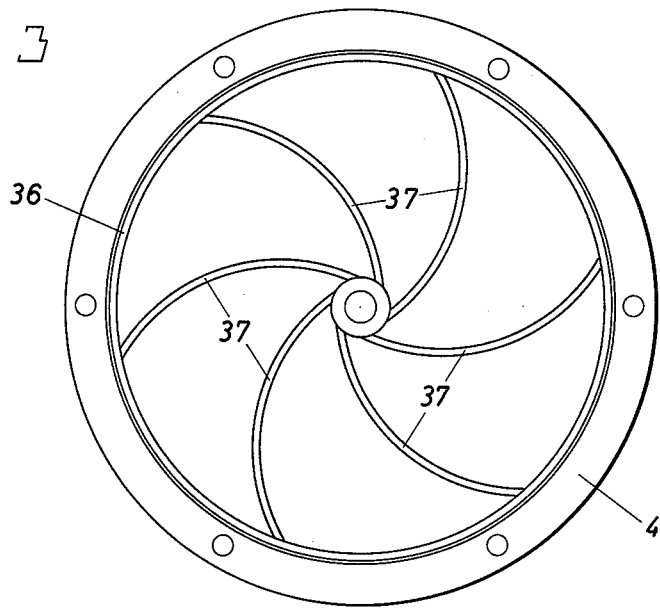
FIG. 3 is a transverse section view taken substantially along line 3—3 of FIG. 1.

Referring now to the drawings in detail, in which like numbers represent like parts, an embodiment of the automatic transmission of the present invention shown in FIGS. 1–6 comprises a multipart housing forming a crank case 1, a cylinder 2 for a reciprocating piston 5, an enlarged cylindrical housing 3 and a turbine housing 4. The piston 5 is connected by a piston pin and a connecting rod 6 to a crank pin 7. The crank pin is formed integrally with a carriage 9 mounted for radial movement within a dovetailed slot in a crank disc 8 fixed to an input or drive shaft 14 which is mounted for rotation within a crank case extension 15. A spindle 10 provided with reverse threads is received within aligned openings in the carriage 9 and crank disc 8 for rotation about an axis extending radially of the axis of the disc. Upon rotation, the spindle 10 coacts with a pawl (not shown) on the carriage 9 to drive the crank pin 7 outwardly from its innermost neutral position, where the crank pin 7 is coaxial with the drive shaft, to a maximum stroke position, and then to drive the carriage inwardly to the neutral position before repeating the cycle, all without a change in the direction of rotation of the spindle.

On the outer ends of the spindle are mounted a pair of pinion gears 11, of which one is fixed to the spindle and the other is freely mounted thereon. A ring gear 12 coacting with the gears 11 is rotatably mounted on the outer periphery of the disc 8 and provides a brake drum for a brake band 13 wrapped thereabout. The inner end of the brake band is suitably fastened to the crank case 1 and the outer end is connected to a control lever 20 pivotally mounted to the crank case (FIG. 4). The lever 20 is movable outwardly for tensioning the brake band for bringing about, during rotation of the drive shaft 14, radial adjustment of the crank pin 7 and thereby effect a change in the stroke of the piston 5.

A locking rod 17 slideably mounted within an axial bore in the drive shaft 14 is biased into engagement with the carriage 9 by a compression spring 18 and thereby serves for locking the carriage against inadvertent radial movement on the disc 8. The locking rod 17 can be shifted to the left, as seen in FIG. 1, for releasing the carriage by means of a lever 19 pivoted to the crank case extension 15 and suitably connected to the control lever 20, as by a flexible band 18'. The lever 19 has an inner bifurcated end (FIG. 6) with inwardly extending rollers that are received within an annulus of a control sleeve 16 slideably mounted on the drive shaft 14 and fixed to the rod 17. Consequently, when the control lever 20 is pivoted for tensioning the brake 13 the locking rod 17 is withdrawn from the carriage 9 to allow radial adjustment of the carriage on the disc 8.

A base, or divider plate 22, separates a piston operating chamber 21 and a fluid distribution chamber 21' from the chamber of the turbine housing 4. The divider plate 22 is suitably attached to the cylindrical housing 3 and includes a plurality of angularly spaced openings chamfered to provide valve seats for pump outlet valves 23 urged in the closing direction by compression springs 25. The divider plate 22 also has a central opening chamfered to provide a valve seat for a pump inlet valve 24 urged in the closing direction by a compression spring 25'. Formed integrally with the divider plate 22 are an annular rib 22' and a plurality of radially extending outer and inner guide vanes 26, 27, respectively, which define with the rib 22' and divider plate 22 a pair of concentric annular chambers 28, 28'. The outer annular chamber 28 provides an inlet passage from the pump outlet valves 23, and communicates via openings 29 in the housing 3 with a plurality of angularly spaced compensators or accumulators 30 having spring-loaded pistons 31 movable outwardly by the fluid pressure in the chamber 28. A turbine wheel 36 rotatably mounted in the turbine housing 4 on an output or driven shaft 38 has a plurality of arcuate vanes 37 extending from adjacent the guide vanes 26, 27. These turbine vanes 37 in a well known manner are adapted for converting the kinetic and pressure energy of the transmission fluid flowing from the piston operating chamber 21 through the pump outlet valves 23 to the turbine into a torsional drive of the output shaft 38.

The transmission is filled with a hydraulic fluid, and upon reciprocation of the piston 5, the fluid is intermittently pumped from the operating chamber 21 through the outlet valves 23 to the turbine wheel 36 and intermittently drawn through the central inlet valve 24 to the operating chamber 21 with the valves 23, 24 thereby oscillating in synchronism with the piston. The hydraulic fluid thereby gives up its energy to the turbine vanes 37, with the excess quantity of fluid pumped into the annular chamber 28 being accumulated by the accumulators 30 for a short time and thereafter given off to the turbine during the intake stroke of the piston 5, with the result that when the turbine wheel 36 is driven at a suitable speed, substantially continuous and uninterrupted fluid flow to and from the turbine wheel is provided due to the inertia and velocity head of the hydraulic fluid and the inertia of the turbine wheel and of the mechanism (not shown) driven thereby. In essence, the fluid pump provided by the reciprocating piston 5 is connected in series with a closed fluid circuit comprising the turbine, the annular chambers 28, 28′, and the fluid distribution chamber 21′ therefore allowing a continuous and "free wheeling" drive of the turbine wheel with a pulsating positive displacement pump.

A transmission regulator 33 is mounted on the turbine housing for drive by the output shaft 38, as by a pair of pulleys 39, 39′ and a drive belt 40. Referring to FIG. 7, the regulator 33 includes a housing 60 with a front wall 61 which serves for mounting a regulator drive shaft 64 in suitable bearings 62. An eddy-current drive comprising a permanent magnet 66 attached to the regulator shaft 64 by a disc 65 and a bell-shaped disc 67, preferably constructed of aluminum, connects the regulator shaft 64 to a control shaft 68 mounted for rotation on a pair of thrust bearings 69. A spiral torsion spring 70 fixed to the control shaft 68 and to the housing 60 by a bracket 71 places a torsional bias on the shaft 68 against the bias of the eddy-current drive, which torsional bias is in the counterclockwise direction as seen in FIG. 8. The eddy-current drive is connected to an electrical switching mechanism including a flexible two arm contact element 72 fixed for rotation with the shaft 68 and having a pair of contact fingers 73, 74 adapted for sliding contact with a pair of stationary contacts 77, 76, respectively. The stationary contacts are mounted to a support 75 fixed to the regulator housing coaxially with the control shaft 68. The stationary contact 76 is constructed for continuous contact with a sliding contact finger 74 of the contact element 72, whereas the stationary contact 77 has a plurality of inwardly extending radials to provide for intermittent contact with a contact finger 73 of the contact element 72, for which purpose the contact finger 73 is made substantially narrower than the spacing between the radials of the contact 77.

The eddy-current drive operates in the well known manner to effect angular displacement of the control shaft 68 against the bias of the torsion spring 70 an amount which increases with the rotational speed of the regulator shaft 64 and therefore with the speed of the output shaft 38 of the transmission. A pair of stop pins 78, 78′ fixed to the support 75 provide for limiting the angular travel of the movable contact 72 between a stop or low speed position where the contact finger 73 is in electrical engagement with the contact 77, and a high speed position, shown in phantom in FIG. 8, where the contact finger 73 is out of electrical engagement with the contact 77.

Referring to FIG. 9, an electromagnetically operated two position valve 32 mounted on the housing 3 is electrically connected by suitable electrical leads in series with the switching mechanism of the regulator 33 and to an electrical power source. The valve 32 is of conventional type with a spool element 81 biased to the left, as seen in FIG. 9, by a compression spring 82 and actuated to the right against the spring bias by an electromagnetic valve operator 84. The valve 32 is connected to any suitable pressure fluid supply and is connected to a linear motor 35 by a pair of conduits 34, 34′. Upon reference to FIG. 4, it will be seen that upon connecting the conduit 34 to the fluid supply and the conduit 34′ to a return conduit, the piston rod of the motor 35 is extended against a compression spring to pivot the control lever 20 and thereby effect an adjustment of the stroke of the piston 5 and upon connection of the conduit 34′ to the fluid supply and the conduit 34 to the return conduit, the piston rod of the motor 35 is retracted under the assistance of the compression spring. The valve 32 is therefore connected to the motor 35 so that upon energization of the electromagnetic operator 84 by the switching mechanism of the regulator 33 the piston rod of the motor 35 is extended to effect an adjustment of the piston stroke and upon deenergization of the electromagnetic operator the piston rod is retracted to effect a cessation of such adjustment.

In operation, the piston 5 is driven by the input shaft 14 of the torque converter to supply fluid under pressure to the turbine and thereby drive the output shaft 38. It should be understood that the mechanical advantage provided by the transmission will decrease and the speed ratio of the output and input shafts will increase with an increase in the stroke of the piston 5. Where the crank pin 7 is in neutral, there is of course no fluid pumping by the piston 5 and therefore, for starting, the crank pin may be displaced from its neutral position as by manual operation of the control lever 20 with a spade handle 49 (FIG. 4). The piston 5 now operates with a short stroke to provide low speed, high torque drive of the turbine wheel 36. As soon as fluid pressure is developed in the torque converter, the regulator 33 provides control for increasing the stroke of the piston 5 in cooperation with the angular acceleration of the output shaft 38 and thereby provides for automatically and continuously "shifting" the torque converter with the increasing speed of the shaft 38. Thus, it can be seen that as the shaft 38 accelerates, the contact arm 72 will be angularly displaced to send electrical impulses to the electromagnetically operated valve 32. The valve 32 in turn provides for activating the motor 35 for pivoting the control lever 20 for the duration of each electrical impulse whereby the stroke of the piston 5 is gradually increased as the speed of the output shaft 38 increases to the point where the contact element 72 engages the stop 78′.

With a decrease in the speed of the output shaft, as due to an increase in the shaft load or a decrease in the speed of the input shaft 14, the movable contact arm 72 will wipe across the radials of the stationary contact 77 to provide electrical impulses to the valve 32 and thereby effect adjustment of the stroke of the piston 5. Where the prior stroke change was an increase the stroke will continue to increase to its maximum before it then decreases to an amount appropriate to the torque requirements of the output shaft 38. The length and number of the electrical impulses to the valve 32 will, it should be understood, depend upon the rate and amount of the speed change of the output shaft 38, and therefore the rate and amount of stroke adjustment will depend upon the rate and amount of speed change of the output shaft 38. Accordingly, an automatic hydraulic transmission of power is provided having substantially stepless torque conversion throughout the complete range of the converter. If and when desirable the torque converter can be manually returned to the neutral position through actuation of the spade handle 49. Additionally, with the regulator system of the present invention, the transmission is capable of infinitely variable torque transmission and is automatically regulated for accelerating the output shaft or for increasing the torque upon an increase in load or a decrease in input shaft speed.

As will be apparent to persons skilled in the art, various modifications and adaptations of the structure above described will become readily apparent without departure from the spirit and scope of the invention, the scope of which is defined in the appended claims.

I claim:

1. In an hydraulic transmission having a fluid pump, a fluid operated motor, and fluid connection means operably connecting the fluid pump and the fluid motor, the improvement wherein the fluid pump comprises a piston operating chamber and a piston reciprocable in the operating chamber to provide a pulsating positive displacement output; wherein the fluid motor is a nonexpansible fluid motor; and wherein the hydraulic transmission comprises a closed fluid circuit with the fluid motor and the fluid pump connected in series flow arrangement therein, pump inlet and outlet one-way flow control means, and accumulator means in the fluid circuit located between the pump outlet one-way flow control means and the motor inlet.

2. The improvement of claim 1 wherein the fluid pump has a variable displacement and further comprising transmission control means for automatically increasing the pump displacement as the speed of the motor increases and for automatically decreasing the pump displacement as the speed of the motor decreases.

3. In the transmission of claim 2 wherein the fluid pump comprises a reciprocable pump piston and means for adjusting the stroke of the piston; wherein the fluid motor comprises a turbine; and wherein the transmission control means comprises fluid operated actuator means for operating the stroke adjustment means, valve means for controlling the actuator means, and regulator means driven by the turbine for regulating the valve means.

4. In the transmission of claim 3 wherein the fluid operated actuator means includes a cylinder and a piston reciprocable in the cylinder for operating the stroke adjusting means; wherein the valve means includes a two-position valve spring actuated to one position and electromagnetically actuated to its other position; and wherein the regulator means includes a rotatable first contact element, a second contact element having a plurality of contacts angularly spaced with respect to said first contact element whereby angular movement of the first contact element results in alternate electrical engagement and disengagement with the second contact element, and drive means providing an increasing angular displacement of the first contact element with increasing speed of the turbine.

5. In a transmission having a fluid pump, a fluid motor, and fluid connection means operably connecting the fluid pump and fluid motor, the improvement wherein the fluid pump is a positive displacement pump of the reciprocating piston type providing a pulsating volumetric output; wherein the fluid motor is a nonexpansible motor; and wherein the hydraulic transmission comprises a closed fluid circuit with the fluid motor and the fluid pump connected in series flow arrangement therein, pump inlet and outlet valve means, and accumulator means in the fluid circuit located between the outlet valve means and the motor inlet.

6. A transmission comprising a rotary driving element, a fluid pump including a piston operating chamber and a piston reciprocable in the operating chamber operatively connected to the driving element, means for adjusting the stroke of the piston, a rotary driven element, a nonexpansible fluid motor operatively connected to the driven element, means providing a closed fluid circuit with the fluid motor and the fluid pump connected in series flow arrangement, valve means for the pump including pump inlet and outlet valve means, and accumulator means in the fluid circuit between the pump outlet valve means and the motor inlet for storing hydraulic energy during the power stroke of the piston and for delivering the stored hydraulic energy to the motor during the intake stroke of the piston.

7. A transmission comprising a rotary driving element, a fluid pump including a piston operating chamber and a piston reciprocable within the operating chamber operatively connected to the driving element, means for adjusting the stroke of the piston, a rotary driven element, a rotary fluid turbine connected to the driven element, means providing a closed fluid circuit with the fluid pump and the turbine connected in series flow arrangement and including means defining turbine inlet and outlet chambers in coaxial relationship with the turbine, pump inlet and outlet valve means in the fluid circuit between the outlet and inlet chambers respectively and the piston operating chamber, and fluid accumulator means in the fluid circuit in fluid communication with the inlet chamber between the pump outlet valve means and the turbine.

8. The transmission of claim 7 wherein the pump piston is mounted for reciprocable movement along the turbine axis and wherein the pump inlet and outlet valve means include a plurality of pump outlet valves angularly spaced about the inlet chamber and a centrally located inlet valve.

References Cited by the Examiner
UNITED STATES PATENTS

| | | | |
|---|---|---|---|
| 1,628,603 | 5/27 | Ferris | 103—38 |
| 1,649,347 | 11/27 | Hardt | 103—38 |
| 1,904,496 | 4/33 | Maw | 60—53 |
| 2,177,381 | 10/39 | Bichi | 60—54 X |
| 2,291,011 | 7/42 | Vickers | 60—53 |
| 2,654,999 | 10/53 | Berge | 60—53 |
| 2,803,112 | 8/57 | Sadler et al. | 60—53 |
| 2,866,150 | 12/58 | Lewis | 60—53 X |

JULIUS E. WEST, *Primary Examiner.*